July 2, 1929. P. C. SMITH 1,719,030
PROCESS OF PREPARING ANIMAL CARCASSES FOR MARKET
Filed Jan. 26, 1928 3 Sheets-Sheet 2

Inventor
Paul Cyrus Smith
Rummler & Rummler
Attys

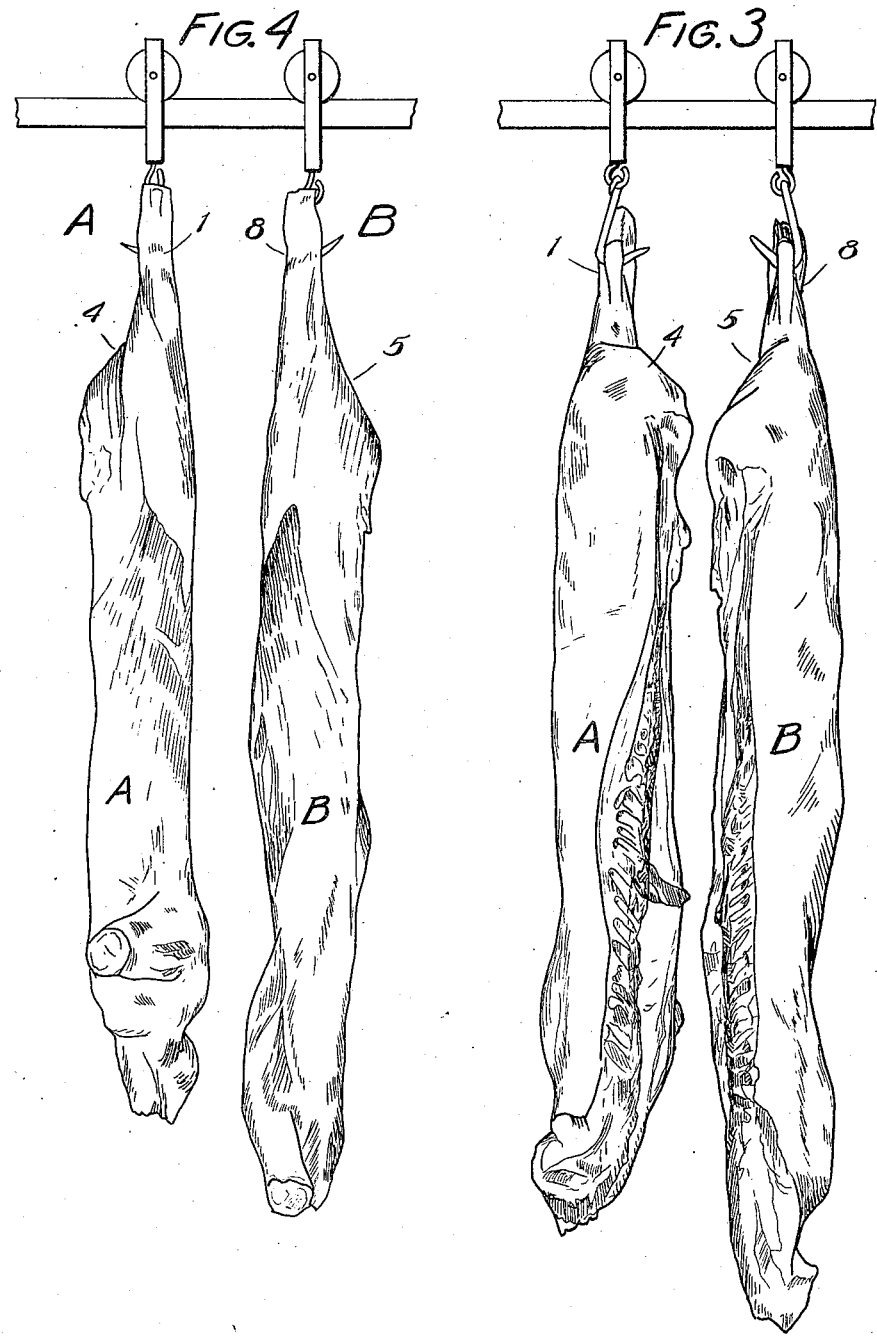

Patented July 2, 1929.

1,719,030

UNITED STATES PATENT OFFICE.

PAUL CYRUS SMITH, OF CHICAGO, ILLINOIS, ASSIGNOR TO SWIFT & COMPANY, OF CHICAGO, ILLINOIS, A CORPORATION OF ILLINOIS.

PROCESS OF PREPARING ANIMAL CARCASSES FOR MARKET.

Application filed January 26, 1928. Serial No. 249,594.

My invention relates particularly to preparing for market the carcasses of cattle, sheep, hogs, or other animals having similar vertebrate and cartilaginous structure in the lumbar region, or from end to end of the spine. Cattle, sheep, hogs, and other animals of the class above described, and to which this invention particularly relates, heretofore have been usually hung by one end thereof and chilled so as to set while in such hanging position.

For a long time it has been the practice of packers and butchers, in preparing animal meat for the market, to hang the carcass from one end thereof to permit bleeding, immediately after killing, and then to chill the carcass while so hung. Under such practice, the bone structure and the muscles have been set in a strained or tensioned position, due to the weight of the carcass, as distinguished from the more natural or relaxed position of the bone structure and muscles, as they would be when an animal is standing or lying at rest.

This old practice of chilling in the hung position, has resulted in toughening, and making less tender, and less palatable certain parts of the meat, due to the stretching.

With the muscles in the stretched position, and the bone structure distorted, as results from the old method of hanging the carcass and chilling it in the hung position, I find that the meat is not as suitable for being cut directly across the grain, either by the dealer, or in serving it, after being cooked, as is the case when the bone structure and muscles have been restored to the more natural or relaxed position, and chilled in that position, as hereinbefore described.

The main object of my invention is to avoid the above-mentioned objections to the old method, and to improve the meat, both in texture and in appearance; providing a shorter, thicker, and straighter carcass.

My process will be better understood by reference to the accompanying drawings in which:

Fig. 3 is a view from the back of the carcass showing the respective sides or halves A and B illustrated in a different position in Fig. 1.

Fig. 4 is a view from the belly side of the said respective sides or halves A and B.

In preparing the side, or split half A, according to my process, the carcass was first hung in the usual manner, immediately after killing, to permit bleeding, and was then split in the usual manner, as with an ax, while the carcass was in the hung position and before chilling. While the muscles and tendons were still pliable, and before chilling, the split half A of the carcass was laid out upon a wooden frame, such as shown in Fig. 2. The parts were then moved by hand to the position shown in Fig. 2, the aim being to restore the bone structure and muscles more nearly to their relaxed or natural position as they would be when the animal is standing at rest, except that here the hind shank 1 was moved slightly backward with reference to the natural standing position, it being here moved in the direction of the top of Fig. 2, and held in that position by the hook and turnbuckle member 2. This holding of the hind shank in the position described and shown, is not an essential part of my process, but is in fact a slight deviation from the relaxed position since the hind shank here approaches more nearly the strained or tensioned position which I regard as objectionable in the old method hereinbefore mentioned. The bones and muscles at the end near to the fore-shank 3, as shown in the half A of Fig. 1 and as shown in Fig. 2, are in the relaxed position in accordance with the aim of my process, except that the hind shank 1 was here pulled slightly rearward of the natural standing position of the animal, as above mentioned, with the view to having that part of the carcass, including the round of the beef, more nearly in the position to which the butcher and dealer is accustomed, than it would be if it were in a more completely relaxed position such as is illustrated by the position of the fore-shank 3.

Figure 1:
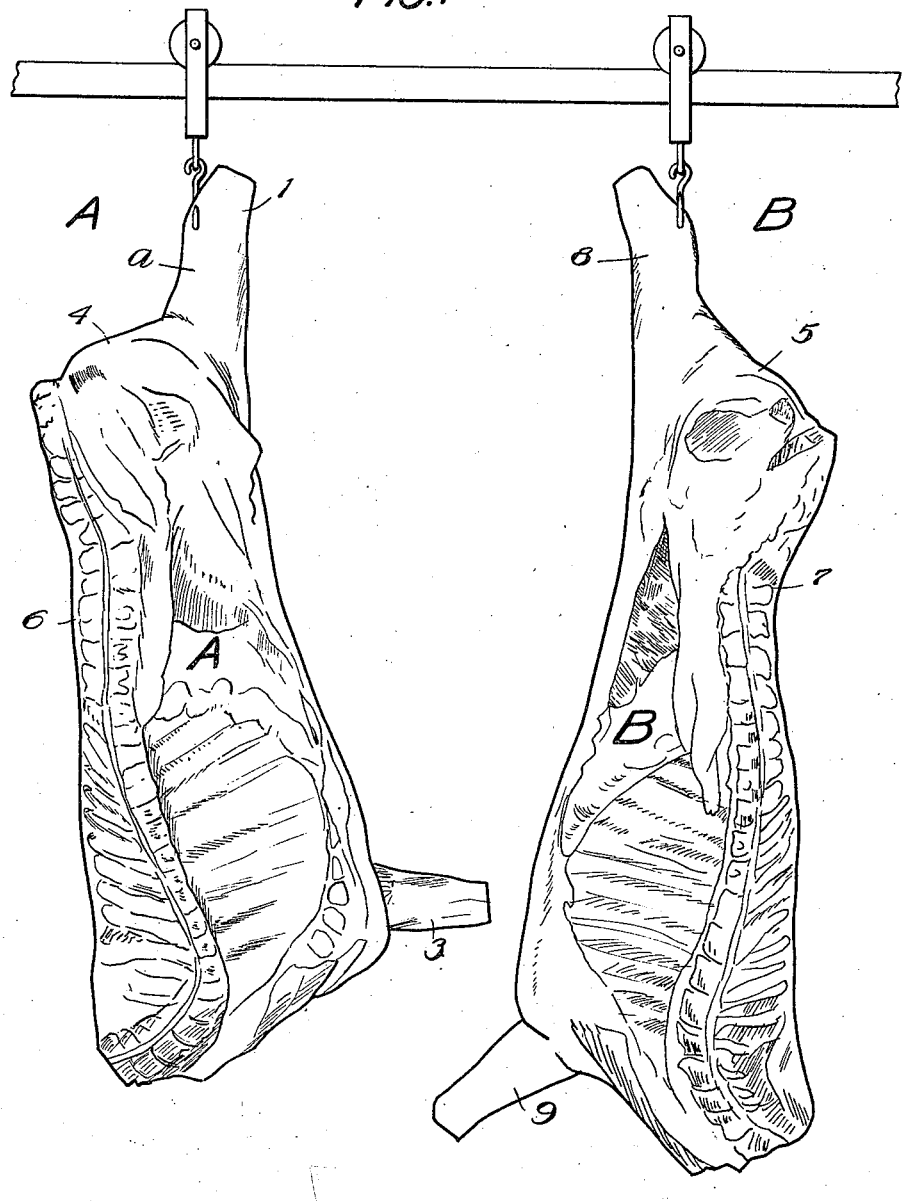
Figure 1 shows the respective sides or halves, A and B, of the same carcass, the side or half A having been prepared according to my process and the other side or half B having been prepared according to the old method heretofore mentioned.
Figure 2:
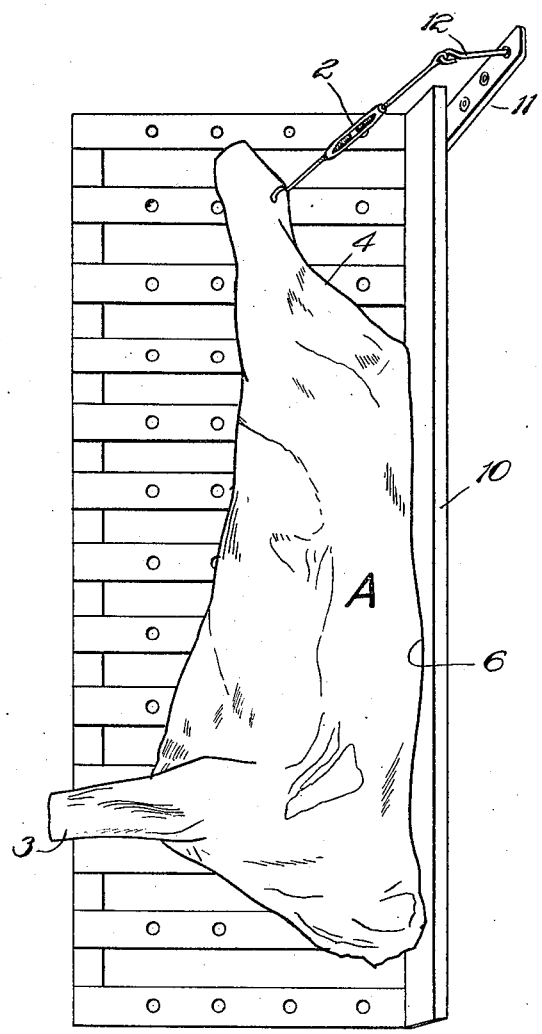
Fig. 2 is a perspective view illustrating one way in which a side or half A of a split carcass may be laid out with the bone structure and muscles restored substantially in the relaxed or natural position, except that the hind shank 1 is here drawn back slightly from the natural position.

In placing the half carcass A in the relaxed position, the shank 1 is at first not pulled as far backward as indicated in Figs. 1 and 2, so that the upper surface of the round of the beef, at 4, is shown more nearly in the natural position, as when the animal is standing, than is the case under the old method where the corresponding surface of the round is indicated by the reference numeral 5, in the half B. It was my aim in moving the rear shank to the position shown at 1, to merely move away from the relaxed position, the part next to the hock, at $a$, so as to take up part of the play in the stifle-joint, and to this extent to deviate from the main aim of my process, for the reason above-mentioned.

When the carcass is placed in the relaxed position, the back bone or spine will be placed more nearly in a straight line, as at 6 in the half A of Fig. 1 and in Fig. 2, as distinguished from the position shown at 7 in the half B of Fig. 1. The strained and distorted position, shown at 7, is due to the fact that when the carcass is hung under the old method, the bones and joints at the rump and near the loin are pulled in such manner as to bend the spine inward, as shown at 7.

In my process, when the parts are placed in the relaxed position, the carcass is then chilled before again hanging, so as to set the muscles, tendons, and bones in that position, as distinguished from the strained or tensioned position which they occupy when the carcass is chilled while hung or suspended, according to the old method, as illustrated in the half B of Figs. 1, 3 and 4. In the old method, the hind shank at 8 carries the weight of the carcass while still limp and pliable, and permits the stretching of the entire carcass in such manner that the fore-shank will be in the position indicated at 9, in Fig. 1, being very much lower with reference to the position of the fore-shank as shown at 3 in the half A of Fig. 1.

Under my process, the carcass is chilled while the muscles and bones are in the relaxed position as illustrated in A of Figs. 1, 3 and 4, and in Fig. 2, and is left lying or otherwise supported in such relaxed position, while the chilling continues until the muscles are set. Thereafter the carcass, so treated, may be hung while the muscles and bones remain in such set position.

In Fig. 2, a board 10 serves as a guide to place the back of the animal or spine so that the upper surface of the bones, as at 6, in Fig. 1, is in a substantially straight line, more nearly approaching the natural position in which they would be when the animal is standing at rest.

Here the upright 11 serves to hold the hook 12, supporting the turnbuckle member 2. This particular method of holding the carcass in the relaxed position, is obviously of little, if any importance, since the parts may be so laid out or supported upon a bench or other support, without any such rack or guiding means as is here shown. Under my process, in its broadest sense the split halves of the carcass may be separately treated as herein described, or the splitting may be omitted and the whole carcass otherwise treated as herein described, the main feature of my process being the chilling of the carcass with the muscles and bones restored to the more natural relaxed position as hereinbefore described.

I find that in carcasses that have been treated according to my hereinbefore described process, that even when the carcass is quartered before the chilling has been carried on to a point at which it would completely set the meat, I avoid a condition that is sometimes referred to as a "slipping away" of parts of the meat. This is due to the fact that in my process the muscle tissue does not become stretched or distorted before chilling, whereas in the old method, the muscle tissue has been stretched and distorted, and, if then quartered before it has been chilled until completely set, the muscle tissue will tend to resume the more natural position. This causes a slipping or drawing away of parts thereof, and, because of a distorted appearance, the meat is not as readily salable. Also, I find that meat treated according to my process has a better and more natural marbled appearance due to the more natural positioning and formation of the fat and lean parts of the meat. Also, in a great many cases, as particularly in the case of carcasses of good quality beef, I find that treating according to my process results in a better and brighter color of the meat which may be due to the fact that the meat seems to retain more moisture. This, I believe, is the result of having a thicker and shorter carcass with less evaporation of moisture in a given time.

I am aware that meats and animal parts, and also fish and parts thereof, have heretofore been laid out, merely incident to circumstantial convenience, with the muscles or bones in more or less relaxed positions and have been thereafter chilled and marketed or used as foods, but I believe that this has been more or less accidental and without any discovery or recognition of the benefits which I now claim as newly discovered by me, and has not been done for the purpose of systematically and intentionally improving the appearance of the carcass or the quality and texture of the meat, nor with any thought or intention of thereby preventing distortion. I do not claim as my process, any such accidental placement of the parts in relaxed position before chilling, but I regard my process as an important improvement in the packing industry, particularly in the art of preparing carcasses for the market, as distinguished from the methods that have been heretofore systematically and intentionally practiced by packers and butchers, in the treatment of such carcasses, as hereinbefore mentioned.

What I claim as my invention and desire to secure by Letters Patent is:

1. The process of preparing for market, the carcasses of animals of the class described, which consists in systematically, and for the purpose herein described, placing the carcasses with the muscles in a substantially relaxed position, and then chilling them so as to set the muscles in that position, as distinguished from the strained or tensioned position ordinarily resulting from chilling while the carcass is suspended or hung from one end thereof.

2. The process of preparing for market, the carcasses of animals of the class described, which consists in systematically, and for the purpose herein described, first hanging the carcasses to permit bleeding, then splitting or dividing the same, then placing the parts with the muscles in a substantially relaxed position, and then chilling them so as to set the muscles in that position as distinguished from the strained or tensioned position ordinarily resulting from chilling while the carcass is suspended or hung from one end thereof.

3. The process of preparing for market, the carcasses of animals of the class described, which consists in systematically, and for the purpose herein described, placing the carcasses with the muscles and bone structure in a substantially natural position such as they would occupy when the animal is standing at rest, and then chilling them so as to set the muscles and bone structure substantially in that position.

4. The industrial process of preparing animal carcasses for market, with minimized anatomical distortion, which consists in butchering the animals to the extent of splitting in halves, then while still warm and limber, laying the halves recumbently and while thus disposed, chilling and setting the same by operation of heat radiation and time.

5. The process of preparing animal carcasses for market, which consists in splitting the carcass before the fibres are set, chilling the cut sections while the fibres are still in the relaxed condition, and then suspending the cut sections.

6. The method of preparing, for the market, carcasses of animals having the lumbar portion of the spinal column flexible, which consists in disposing the carcasses in a substantially relaxed position, and then chilling them to fix them in such position.

7. The process of preparing for market the carcasses of animals of the class described which consists in systematically, and for the purpose herein described, dressing the animals to the extent of eviscerating, and subsequently, and before the muscles are set, placing the carcasses with the muscles in a substantially relaxed position and then chilling them so as to set the muscles in that position, as distinguished from the strained or tensioned position ordinarily resulting from chilling while the carcass is suspended or hung from one end thereof.

8. The process of preparing for market the carcasses of animals of the class described which consists in systematically, and for the purpose herein described, dressing the animals to the extent of eviscerating and subsequently, and before the muscles are set, placing the carcasses with the muscles and bone structure in a substantially normal position such as they would occupy when the animal is standing at rest, and then chilling them so as to set the muscles and bone structure substantially in that position.

9. The method of preparing for market the carcasses of animals having the lumber portion of the spinal column flexible, which consists in dressing the animals to the extent of eviscerating, and subsequently, and before the muscles are set, disposing the carcasses in a substantially relaxed position, and then chilling and thereby fixing the same in such position.

10. The process of preparing for market the carcasses of animals of the class described which consists in systematically, and for the purpose herein described, dressing the animals to the extent of skinning and eviscerating, and subsequently, and before the muscles are set, placing the carcasses with the muscles in a substantially relaxed position and then chilling them so as to set the muscles in that position, as distinguished from the strained or tensioned position ordinarily resulting from chilling while the carcass is suspended or hung from one end thereof.

11. The process of preparing for market the carcasses of animals of the class described which consists in systematically, and for the purpose herein described, dressing the animals to the extent of skinning and eviscerating and subsequently, and before the muscles are set, placing the carcasses with the muscles and bone structure in a substantially normal position such as they would occupy when the animal is standing at rest, and then chilling them so as to set the muscles and bone structure substantially in that position.

12. The method of preparing for market the carcasses of animals having the lumbar portion of the spinal column flexible, which consists in dressing the animals to the extent of skinning and eviscerating, and subsequently, and before the muscles are set, disposing the carcasses in a substantially relaxed position, and then chilling and thereby fixing the same in such position.

Signed at Chicago this 24th day of January, 1928.

PAUL CYRUS SMITH.